US008970862B2

United States Patent
Takamoto (10) Patent No.: US 8,970,862 B2
(45) Date of Patent: Mar. 3, 2015

(54) FUNCTION EXPANSION METHOD USING PRINT DATA, AND FUNCTION EXPANSION DEVICE

(75) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/000,031

(22) PCT Filed: Feb. 20, 2012

(86) PCT No.: PCT/JP2012/054683
§ 371 (c)(1),
(2), (4) Date: Aug. 16, 2013

(87) PCT Pub. No.: WO2012/115257
PCT Pub. Date: Aug. 30, 2012

(65) Prior Publication Data
US 2013/0321845 A1 Dec. 5, 2013

(30) Foreign Application Priority Data
Feb. 25, 2011 (JP) .................................. 2011-040165

(51) Int. Cl.
*G06F 3/12* (2006.01)

(52) U.S. Cl.
CPC ............ *G06F 3/1206* (2013.01); *G06F 3/1244* (2013.01); *G06F 3/1277* (2013.01); *G06F 3/1284* (2013.01); *G06F 3/1209* (2013.01); *G06F 3/1257* (2013.01)
USPC ........ 358/1.13; 358/1.15; 358/1.16; 358/1.18

(58) Field of Classification Search
None
See application file for complete search history.

(56) References Cited

U.S. PATENT DOCUMENTS

| 5,678,059 | A | 10/1997 | Ramaswamy et al. |
| 6,263,384 | B1 | 7/2001 | Yanase |
| 2002/0154333 | A1* | 10/2002 | Akashi ........................ 358/1.15 |
| 2005/0028093 | A1* | 2/2005 | Michel et al. .................. 715/526 |
| 2006/0274343 | A1 | 12/2006 | Kennis |
| 2007/0146741 | A1 | 6/2007 | Hillmer et al. |
| 2012/0057184 | A1* | 3/2012 | Furuhata et al. ............. 358/1.13 |
| 2013/0314727 | A1* | 11/2013 | Furuhata et al. ............... 358/1.6 |

FOREIGN PATENT DOCUMENTS

| CN | 1991740 A | 7/2007 |
| EP | 1 736 863 A2 | 12/2006 |
| EP | 1736863 A2 * | 12/2006 |
| JP | 08-069427 A | 3/1996 |
| JP | 11-134272 A | 5/1999 |
| JP | 2006-338411 A | 12/2006 |
| JP | 2006-338443 A | 12/2006 |

* cited by examiner

*Primary Examiner* — Miya J Cato
(74) *Attorney, Agent, or Firm* — Nutter McClennen & Fish LLP; John J. Penny, Jr.; Joshua I. Rudawitz (57) ABSTRACT

A method of expanding the function of an application in a computer that operates under an operating system and executes specific processes by an application has a step that acquires and sends print data that is output from the application to a driver to a communication port before the print data is received by the driver; a step that acquires and relays the transmitted print data, or the print data that is output from the application to the communication port, before the print data is received by the communication port; and a step that expands the function of the relayed print data on the application layer, and outputs the processed data to a communication port.

8 Claims, 4 Drawing Sheets

FUNCTION EXPANSION METHOD USING PRINT DATA, AND FUNCTION EXPANSION DEVICE

TECHNICAL FIELD

The present invention relates to a function expansion method for expanding the functions of an existing application using print data output from the application, and relates more particularly to a function expansion method capable of easily providing a range of expanded functions without changing the existing application program and without using an existing printer driver.

BACKGROUND ART

POS systems, which are a type of sales management system, are commonly used in the retail industry in supermarkets, for example. In a POS system, plural terminal devices (registers) connected with a server over a network operate according to an application installed on each terminal device and perform various processes. A printer is typically disposed to each terminal device and outputs receipts and coupons as instructed by the application. Systems that are configured similarly to POS systems that produce such output include systems used in hospitals and systems used by shipping companies.

The need for functional expansion of such systems arises from improvements in technology and changing business needs after the system is introduced. However, because these systems are central to business operations and are always being used, and are connected to other systems in complex ways, modifying the application is not usually simple.

To solve this problem, ideas such as described below related to output process functions have been proposed.

Patent document 1 describes a device that renders a modem function in a personal computer that enables eliminating the microprocessor and memory that are required in a conventional modem without needing to modify an existing application program.

Patent document 2 describes a device that can access one communication port and cause a printer connected to another communication port to print simultaneously so that duplicate copies can be printed without modifying the application.

CITATION LIST

Patent Literature

PTL 1: Japanese Unexamined Patent Appl. Pub. JP-A-H08-69427
PTL 2: Japanese Unexamined Patent Appl. Pub. JP-A-2006-338443

SUMMARY OF INVENTION

Technical Problem

The content of patent documents 1 and 2, however, stops at implementing functions limited to the output system, such as modem functions and duplicate printing functions, and cannot accommodate many other needs. Furthermore, because patent document 2 describes processing at the OS kernel level, creating new functions (including program development) is not easy and the functions are also limited.

In addition, when a printer is replaced with a new printer in such systems, using the driver for an existing printer is, as a rule, preferably avoided.

Therefore, an object of the invention is to provide a function expansion method and a function expansion device that use print data output from an existing application to expand the function of the application, and are capable of easily adding a variety of functions without changing the existing application program and without using an existing printer driver.

Solution to Problem

To achieve the foregoing object, an aspect of the invention is a function expansion method that executes a process that expands the function of an application on a computer that operates according to an operating system on the operating system kernel layer, executes a specific process according to the application on an application layer, and has one or more communication ports, and has: a virtual driver-step in which the computer acquires print data output from the application to a printer driver before the print data is received by the printer driver, and sends the print data to the communication port specified in the print data; a virtual port step in which the computer acquires on the OS kernel layer print data sent to the communication port, or print data output from the application to the communication port, before the print data is received by the communication port, and relays the acquired print data to the application layer; and a function expansion step in which the computer applies a process that expands the function of the relayed print data on the application layer, and outputs the print data after processing to the communication port suited to the data.

To achieve the foregoing object, another aspect of the invention is a function expansion device that includes a computer that operates according to an operating system on the operating system kernel layer, executes a specific process according to the application on an application layer, and has one or more communication ports, the function expansion device executing a process that expands the function of the application and including: a virtual driver that acquires print data output from the application to a printer driver before the print data is received by the printer driver, and sends the print data to the communication port specified in the print data; a virtual port that acquires on the OS kernel layer print data sent to the communication port, or print data output from the application to the communication port, before the print data is received by the communication port, and relays the acquired print data to the application layer; and a function expansion unit that applies a process that expands the function of the relayed print data on the application layer, and outputs the print data after processing to the communication port suited to the data.

Another preferred aspect of the invention is characterized by the function expansion step including a step of analyzing the relayed print data, and determining the content of the function expansion process and the communication port used for output based on the result of the analysis.

Another preferred aspect of the invention is characterized by the function expansion step including a step of converting the relayed print data to commands for the printer connected to the communication port that outputs the data.

Another preferred aspect of the invention is characterized by the content of the function expansion process including any of a group of operations including changing the content printed by the print data, changing the output communication port, generating print data for a new printout, and acquiring information from the print data.

Advantageous Effects of Invention

The invention enables variously expanding the functions of a PUS system using a simple method that does not involve changing the existing POS application program. Because the main function expansion process executes on the application layer of a computer, programs implementing various processes can be easily developed.

In addition, because the process does not use an existing printer driver, a printer that is incompatible with the existing printer driver can be used for printing.

Yet further, because the data processed is in the foregoing standard format when processed on a route through the virtual driver 210, processing is simple.

Other objects and features of the invention will become clear from the embodiments of the invention described below.

DESCRIPTION OF EMBODIMENTS

Preferred embodiments of the present invention are described below with reference to the accompanying figures. The following embodiments do not, however, limit the technical scope of the invention. Note, further, that identical or like parts are referenced by like reference numerals in the accompanying figures.

Figure 1:
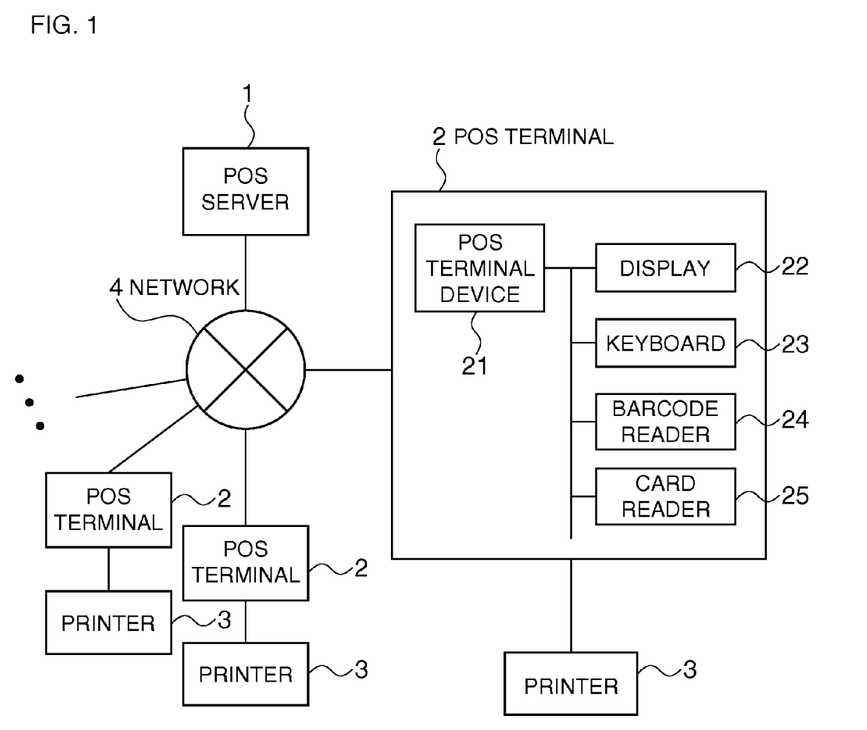
FIG. 1 shows an example of the configuration of a POS terminal device according to the invention.
Figure 2:
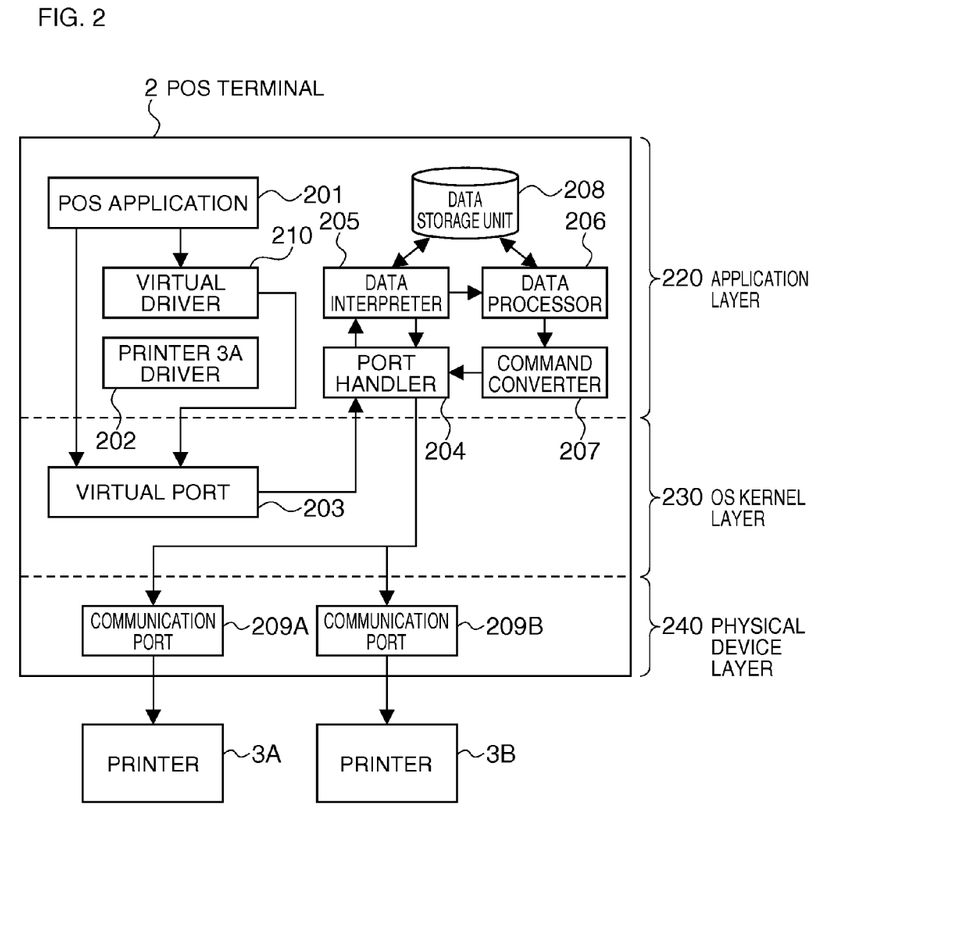
FIG. 2 is a function block diagram of the POS terminal device.

FIG. 1 shows an example of a POS terminal according to this embodiment of the invention. FIG. 2 is a function block diagram of the POS terminal device. The POS terminal 2 shown in FIG. 1 and FIG. 2 is a device that uses the invention. In this device (function expansion device), a virtual driver 210 acquires print data output from a POS application 201 (application) to an existing printer driver (driver 202 for printer 3A), and sends the acquired print data without converting it to commands for the printer to the communication port 209A to which the existing printer (printer 3A) is connected. The transmitted print data is acquired by the virtual port 203 of the OS kernel layer 230 before being received by the communication port 209A. The acquired data is then received by the port handler 204 of the application layer 220, and executes a specific function expansion process. The processed print data is then output from the port handler 204 to the communication port 209 corresponding to the processed data. By running this process, the POS terminal 2 can easily expand the functions of the application without changing the existing POS application 201 program and without using an existing printer driver.

This embodiment of the invention describes a POS system such as used in a supermarket, and as shown in FIG. 1 has a plurality of POS terminals 2 connected through a network 4 to a POS server 1. The POS server 1 is a computer system that manages the plural POS terminals 2, and runs processes to tabulate and manage data acquired from the POS terminals 2.

A POS terminal 2 is installed at each register, and a printer 3 is connected to each. The printer 3 outputs receipts and coupons based on print data output from the POS terminal 2. The POS terminal 2 is thus positioned as the host device of the printer 3.

As shown in FIG. 1, each POS terminal 2 includes a POS terminal device 21, display 22, keyboard 23, barcode reader 24, and card reader 25. The display 22 displays product prices, for example, for the customer, and the keyboard 23 is used by the operator to input product information including prices and product codes, and customer information such as sex or age. The barcode reader 24 is used to get product information by reading product barcodes, and the card reader 25 reads information stored on a card and acquires information needed to complete the transaction.

The POS terminal device 21 generates and outputs information printed on the receipts or coupons to the printer 3 based on information acquired by the keyboard 23, barcode reader 24, and card reader 25. The POS terminal device 21 is a computer including a CPU, RAM, ROM, and hard disk drive or other storage device not shown. A POS application 201 program described below and programs for function expansion processes are stored in ROM, for example, and processes are executed by the CPU operating according to these programs.

The functional configuration of the POS terminal 2 is shown in FIG. 2. The POS application 201 of the POS terminal 2 runs a process to generate and output the information printed on receipts and coupons, and the data generated at this time is the source data before function expansion. The generated print data is in the format enabling direct output to the printer 3A, or data in the format passed to the driver 202 of the printer 3A. The former type is generated when generating simple print data for printing plain text. The latter is output to the driver 202 for printer 3A and to the communication port 209A to which the printer 3A is connected as data in a standard format (such as the Windows (R) GDI format) that can be processed by a generic printer driver.

The printer 3A driver 202 is a printer driver for the printer 3A. The printer 3A driver 202 outputs the data input from the POS application 201 as print data that can be printed by the printer 3A based on commands that depend on the type of printer 3A (device). Note that printer 3A and the printer 3A driver 202 are devices that were already installed on the POS system before applying the system improvements based on the invention.

As shown in FIG. 2, the POS application 201 and printer 3A driver 202 reside on the application layer 220 on which programs execute processes according to the operating system (OS) of the computer. Both are rendered by programs stored in ROM that specify the content of each process, and a CPU and other hardware components that execute processes based on the programs.

The virtual driver 210 is the part that acquires the print data (referred to herein as the "source print data") output from the POS application 201 to the printer 3A driver 202 before the data is received by the printer 3A driver 202, and outputs directly in the standard format to the communication port 209A set by the acquired print data.

The virtual port 203 is the part that receives the source print data output from the POS application 201 or virtual driver 210 at the OS kernel layer 230 where the operating system resides before the data is received by the communication port 209. The virtual port 203 passes the acquired source print data to the port handler 204.

The port handler 204, data interpreter 205, data processor 206, command converter 207, and data storage unit 208 are function expansion units that use the source print data, and POS application 201 functions are expanded by the processes executed by these parts.

The port handler 204 passes the source print data received from the virtual port 203 to the data interpreter 205, and runs a process that receives print data output from the function expansion process (referred to here as the "processed print data") and outputs the processed print data to the communication port 209 appropriate to the data.

The data interpreter 205 is a part that analyzes the source print data and determines the content of the function expansion process, and determines the communication port 209 that outputs the processed print data.

The data processor 206 is a part that processes the source print data according to the process content determined by the data interpreter 205.

The command converter 207 is a part that converts print data to commands that can be processed by the printer 3 connected to the communication port 209 from which the processed print data is output.

The data storage unit 208 is a part that stores data used by the data interpreter 205 and data processor 206. In this embodiment logo data is stored, for example, and is used when adding a logo to source print data for a receipt that does not have a logo. Note that the data storage unit 208 is a hard disk drive or other storage device.

Specific steps in the processes executed by the function expansion units are described below.

Note that the virtual driver 210, virtual port 203, port handler 204, data interpreter 205, data processor 206, and command converter 207 are rendered by respective programs stored in ROM that describe the processes executed by each unit, and a CPU, for example, that executes the processes according to the programs. These are also equivalent to function expansion units of the invention.

Communication ports 209A and 209B are disposed to the physical device layer 240 of the POS terminal 2, and are respectively connected to printers 3A and 3B. In this example communication port 209A is a COM port for serial communication, and communication port 209B is a USB communication port for USB communication. Regarding the printers 3, printer 3A is a monochrome printer and printer 3B is a color printer, for example. In addition, as noted above, printer 3A is an existing printer that has been installed since before improvement based on the invention, and printer 3B is a printer that was newly installed in conjunction with the improvement based on the invention.

Note, further, that there are two communication ports 209 and two printers 3 are connected to the POS terminal 2 in this embodiment, but the number of connected communication ports 209 and printers 3 is not so limited, and there may be one or three or more of each.

Figure 3:
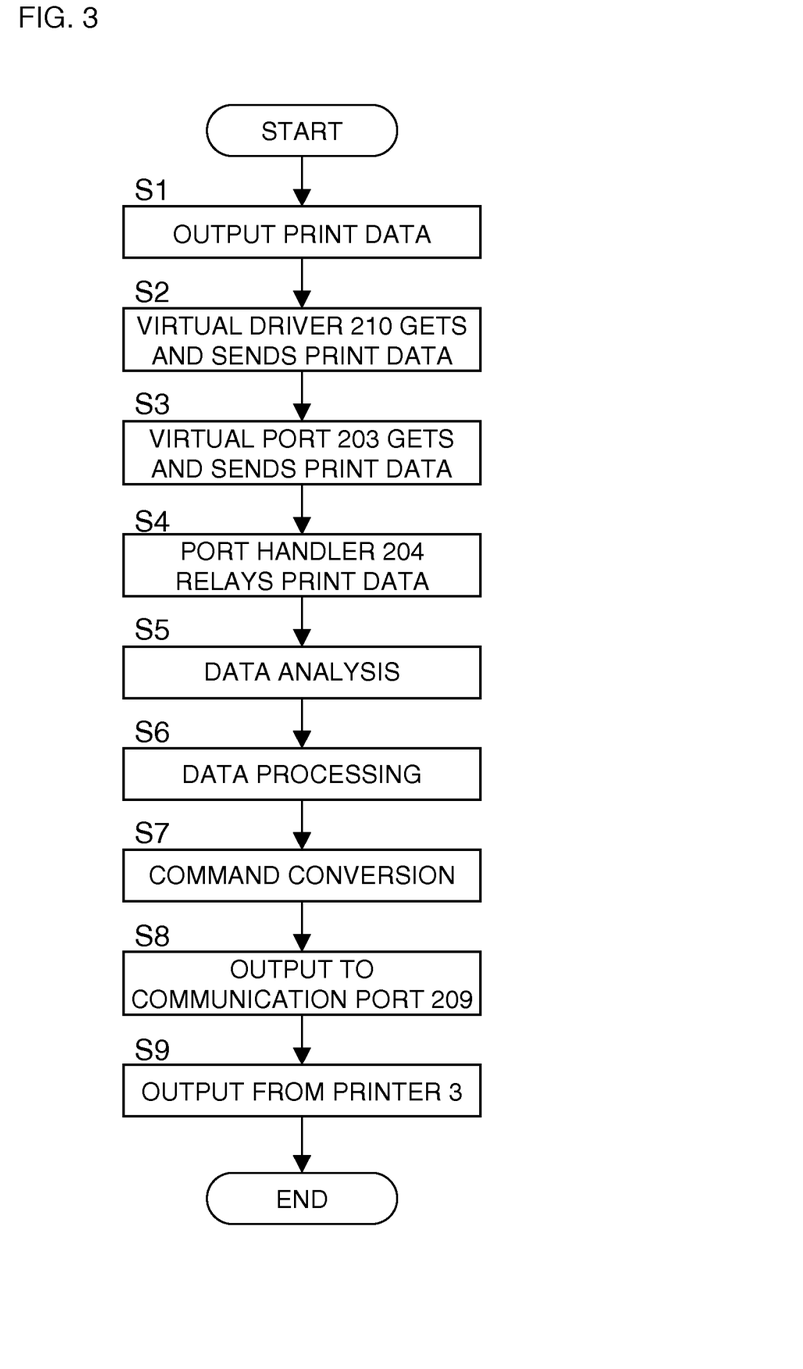
FIG. 3 is a flow chart showing an example of the steps in the function expansion process.

A feature of the POS terminal 2 configured as described above is in the function expansion process of the POS application using the source print data, and specific steps in this process are described below. FIG. 3 is a flow chart of the steps in the function expansion process. First, as described above, the source print data is output from the POS application 201 directly to the printer 3A driver 202 or to the communication port 209A (step S1). The source print data is output from the printer 3A, and in this example the source print data is print data for a receipt, and the communication port 209A is specified as the output communication port. In addition, the source print data output to the printer 3A driver 202 is in a standard format as described above, and the source print data output to the communication port 209A is in the form of commands specific to the printer 3A.

The source print data output to the printer 3A driver 202 is then acquired by the virtual driver 210 before being received by the printer 3A driver 202 (step S2). This step is achieved by configuring the registry settings so that the name of the virtual driver 210 is the name of the printer 3A, and the name of the printer 3A is set to a separate name, and this configuration change is made when the OS boots up.

The virtual driver 210 then sends the acquired source print data in the same standard format to the communication port 209A set in the data (step S2).

The source print data sent from the virtual driver 210 or output from the POS application 201 directly to the communication port 209A is received by the virtual port 203 on the OS kernel layer 230 before reaching the specified communication port 209A (step S3). This step is achieved by changing the registry settings (priority settings) so that data output to any communication port 209 is first received by the virtual port 203, and this configuration change is made when the OS boots up. The received source print data is then passed from the virtual port 203 to the port handler 204 on the application layer 220 (step S3).

The port handler 204 then passes the received source print data to the data interpreter 205 (step S4). The data interpreter 205 interprets the commands in the source print data, and analyzes the data content (step S5). The data interpreter 205 interprets data in the standard format when the source print data is sent through the virtual driver 210, and otherwise interprets commands for the printer 3A. The data interpreter 205 determines the content of the function expansion process (process content) and the output communication port 209 based on the results of this analysis.

More specifically, the data interpreter 205 determines the type of printout produced by the source print data (such as a receipt, coupon, or journal), checks if specific data (text string or image) is contained in the source print data, or determines the content of specific data in the source print data, for example, and determines the content of processes that are predefined according to the results of these operations. The data interpreter 205 also determines the communication port 209 corresponding to the printer 3 suited to outputting the processed print data obtained from these processes. The content of the function expansion process may include, for example, changing the content printed by the print data (such as adding or deleting data), changing the output printer 3, generating new output, or using information contained in the print data for other purposes, and the specific content is predefined from among these. A more specific example of function expansion is described below.

The output device communication port 209 selected by the data interpreter 205 is reported to the port handler 204, and the content of the function expansion process (process content) is reported to the data processor 206. The data interpreter 205 also references data stored in the data storage unit 208 as needed by the process steps. For example, information linking the results of the above analysis to process content is stored in the data storage unit 208. Note that if the process content and output device are fixed irrespective of the source print data, the data interpreter 205 is not required and the source print data is passed from the port handler 204 to the data processor 206.

Next, the data processor 206 processes the source print data (step S6). More specifically, the data processor 206 processes the print data according to the previously determined content of the function expansion process, and generates processed print data. A specific example of this process is described below. Data in the data storage unit 208 may also be referenced as needed in this process. When there are plural operations to perform, the data processor 206 may include plural processing units corresponding to the content of the individual processes. In addition, if the data interpreter 205 determines that data processing (function expansion) is not performed, the data processor 206 does not perform a processing operation.

The processed print data generated by the data processor 206 is then passed to the command converter 207. The command converter 207 runs a process that converts the processed print data to commands for the output printer 3 (step S7). Because the output communication port 209 is determined by the data interpreter 205 as described above, the processed print data is converted to commands specific to the printer 3 connected to that communication port 209. If the source print data passes through the virtual driver 210, a process that converts the standard format to commands specific to the printer 3 is performed.

If the source print data does not pass through the virtual driver 210, the command converter 207 executes a process that converts commands for printer 3A to commands for the output printer 3. For example, the commands may be converted to commands for printer 3B. Note that if printer 3B uses the same commands as printer 3A, or if the output printer is printer 3A, this conversion process is not performed.

The processed print data is then passed to the port handler 204. Note that if command conversion is not required, print data sent from the data processor 206 is passed to the port handler 204.

The port handler 204 then outputs the received processed print data that was received to the selected communication port 209 (step S8). In this embodiment of the invention the port handler 204 outputs to communication port 209A and/or communication port 209B. Note that when a function expansion process is not executed, the source print data is output to the originally specified communication port 209 (communication port 209A in this example).

The print data is then sent from the communication port 209 to the connected printer 3, the printer 3 prints according to the received print data, and a receipt or other printout is output (step S9). For example, a monochrome printout is obtained if output from printer 3A, and a color printout is obtained if output from printer 3B.

The function expansion process of this POS terminal 2 is executed as described above. A more specific example of a function expansion program is described below.

An example of a process that changes the content printed by the above print data is applied to the source print data to reduce or eliminate the line space between printed text strings in order to reduce paper output and conserve resources. This process determines the content of the process based on the type of printout identified by the data interpreter 205, and the data processor 206 then executes the process.

A store logo could also be added to receipts or coupons. In this case, too, the data interpreter 205 determines the process based on the type of printout identified, and the data processor 206 runs a process that reads image data for a logo stored in the data storage unit 208 and adds the logo to the source print data.

Another example is changing all or part of monochrome source print data to color print data. In this case the process content is determined based on the type of printout identified by the data interpreter 205, or detection of specific data for adding color, and the data processor 206 then runs a process to change the intended part to color data. Because the printer 3 that produces the output is also changed in this embodiment, the process of the command converter 207 will also be executed.

An example of function expansion that primarily changes the output printer 3 is described next. Changing the output device of all printouts or some printouts for output on a new printer 3 with higher print quality may be desirable. If the print quality of printer 3B is higher in this embodiment of the invention, the source print data is changed to data for printing on printer 3B, and the output address is changed to communication port 209B.

Output to plural printers 3 (duplicate printing) is also possible. In this case the data processor 206 duplicates the source print data according to the output count, and the command converter 207 converts print commands according to the output device used for each copy. In this example the same printout is produced by both printer 3A and printer 3B. Another process may also be combined with the process that changes data content so that, for example, a color logo is added to the data output from printer 3B.

The output device can also be changed according to the print data content. For example, when order tickets are output in a restaurant and different dishes are prepared at different stations, the data interpreter 205 determines the station where the order ticket should be output based on the content of the source print data, and selects the printer 3 installed at that station as the output device. If the source print data contains orders that are prepared at plural different stations, the order tickets are separated by station, and individual order tickets could be output from the printers 3 installed at the respective stations.

An example of creating a new printout could be a process that produces a new coupon when the source print data is receipt data and a specific product is contained in the print data. For example, if data for a product for which a coupon should be issued is detected in the source print data, the data interpreter 205 determines that the source print data should be printed directly by printer 3A for monochrome printing, and a coupon related to that product should be printed in color by printer 3B. Based on this decision, the data processor 206 reads coupon data stored in data storage unit 208 and generates print data for the coupon. The command converter 207 also operates as needed, and a receipt and a coupon are output.

Another example of function expansion may acquire and use information contained in the source print data for another purpose. For example, when the source print data is receipt data, information about the products sold and time of sale, for example, could be collected and tabulated, and the information could be supplied to a system (application) that creates marketing plans. In this case the data processor 206 acquires and tabulates the information.

As described above, a POS terminal 2 according to this embodiment of the invention can expand the functions of a POS system of which a main function is creating printout using print data output from the POS application 201. An existing POS terminal and POS system can be relatively easily improved to the POS terminal 2 described above and a POS system using the POS terminal 2.

Figure 4:
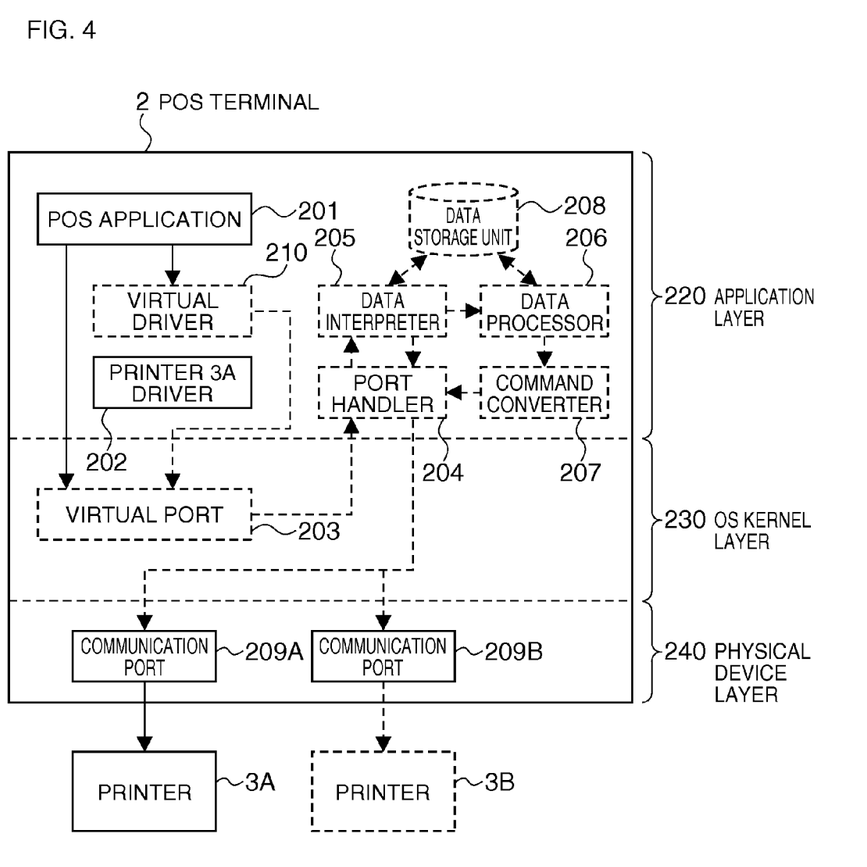
FIG. 4 describes an improvement of the POS system.

FIG. 4 describes such an improvement. This figure shows the same functional components as in FIG. 2 with the solid lines indicating a POS terminal and POS system that do not execute the function expansion process described above. More specifically, the system before improvement receives print data output directly from the POS application 201 or through the printer driver 202 at the communication port 209A, and outputs the printout from printer 3A. The POS terminal 2 according to this embodiment of the invention and a POS system using the same can be achieved by adding the parts denoted by dotted lines to this existing system.

More specifically, the function of an existing POS system can be extended by a process that does not use the existing printer driver (202) by adding the function expansion program, the data stored in the data storage unit 208, and a new printer 38 as described above without changing the existing POS application 201. This improvement (addition) can be done by installing a new printer 38 and printer driver software including the data and function expansion program described above. Note, further, that a configuration that does not have the printer 3A driver 202 and printer 3A after this improvement is also possible.

The function expansion method of the invention as described above can thus be used to expand the functions of a POS system in many ways by means of a simple method that does not involve changing the existing POS application program. In addition, because the main function expansion process executes on the application layer of the computer, programs that perform a variety of processes can be easily developed.

Furthermore, because the process does not use the existing printer driver (printer 3A driver 202), outputting through a printer other than printer 3A, such as using printer 38 in this case, is not a problem.

Processing is also simple when the process passes through the virtual driver 210 because the data to be processed is in the standard format described above.

The process can also be run when the existing printer driver is deleted after the system is improved as described above.

The POS server 1 is connected to plural POS terminals 2 in the embodiment described above, but the invention is not so limited and can be adapted to an environment in which a POS terminal and printer are connected.

The foregoing embodiment of the invention describes a POS system by way of example, but the invention is not limited to POS systems and can be applied to other types of systems having a specific application that includes outputting printed materials from a printer, including systems used in hospitals and shipping companies, for example, and the invention is particularly useful when modifying an existing application program is difficult.

The POS application program and programs for function expansion processes are stored in ROM in the foregoing embodiment by way of example, but storing these programs is not limited to ROM devices, and RAM, a hard disk drive, or other storage media can be used. The programs can also be stored on separate storage media.

The scope of the invention is not limited to the foregoing embodiments, and includes the invention described in the accompanying claims and equivalents thereof.

INDUSTRIAL APPLICABILITY

As described above, the invention is advantageous in function expansion methods for expanding the function of an existing application using print data output from the application, and is suited to function expansion methods that can easily enable adding various functions without changing the existing application program and without using an existing printer driver.

REFERENCE SIGNS LIST

POS server 1
POS terminal 2
printer 3
network 4
POS terminal device 21
display 22
keyboard 23
barcode reader 24
card reader 25
POS application 201
driver for printer 3A 202
virtual port 203
port handler 204
data interpreter 205
data processor 206
command converter 207
data storage unit 208
communication port 209
virtual driver 210
application layer 220
OS kernel layer 230
physical device layer 240

The invention claimed is:

1. A function expansion method that executes a process that expands the function of an application on a computer that operates according to an operating system on the operating system kernel layer, executes a specific process according to the application on an application layer, and has one or more communication ports, the function expansion method characterized by comprising:
    a virtual driver step in which the computer acquires print data output from the application to a printer driver before the print data is received by the printer driver, and sends the print data to the communication port specified in the print data;
    a virtual port step in which the computer acquires on the OS kernel layer print data sent to the communication port, or print data output from the application to the communication port, before the print data is received by the communication port, and relays the acquired print data to the application layer; and
    a function expansion step in which the computer applies a process that expands the function of the relayed print data on the application layer, and outputs the print data after processing to the communication port suited to the data.

2. The function expansion method described in claim 1, characterized by:
    the function expansion step including a step of analyzing the relayed print data, and determining the content of the function expansion process and the communication port used for output based on the result of the analysis.

3. The function expansion method described in claim 1, characterized by:
    the function expansion step including a step of converting the relayed print data to commands for the printer connected to the communication port that outputs the data.

4. The function expansion method described in claim 1, characterized by:
    the content of the function expansion step including any of a group of operations including changing the content printed by the print data, changing the output communication port, generating print data for a new printout, and acquiring information from the print data.

5. A function expansion device that includes a computer that operates according to an operating system on the operating system kernel layer, executes a specific process according to an application on, and has one or more communication ports, the function expansion device executing a process that expands the function of the application and characterized by comprising:

a virtual driver that acquires print data output from the application to a printer driver before the print data is received by the printer driver, and sends the print data to the communication port specified in the print data;

a virtual port that acquires on the OS kernel layer print data sent to the communication port, or print data output from the application to the communication port, before the print data is received by the communication port, and relays the acquired print data to the application layer; and a function expansion unit that applies a process that expands the function of the relayed print data on the application layer, and outputs the print data after processing to the communication port suited to the data.

6. The function expansion device described in claim 5, characterized by:

the function expansion unit analyzing the relayed print data and determining the content of the function expansion process and the communication port used for output based on the result of the analysis.

7. The function expansion device described in claim 5, characterized by:

the function expansion unit converting the relayed print data to commands for the printer connected to the communication port that outputs the data.

8. The function expansion device described in claim 5, characterized by:

the content of the function expansion process applied by the function expansion unit including any of a group of operations including changing the content printed by the print data, changing the output communication port, generating print data for a new printout, and acquiring information from the print data.

* * * * *